United States Patent
Taffinder

(10) Patent No.: US 7,117,794 B2
(45) Date of Patent: Oct. 10, 2006

(54) METHOD FOR MANUFACTURING AN IDENTIFICATION PLATE

(75) Inventor: Richard Ivor Taffinder, West Midlands (GB)

(73) Assignee: Hills Numberplates Limited, Witton Birmingham (GB)

(*) Notice: Subject to any disclaimer, the term of this patent is extended or adjusted under 35 U.S.C. 154(b) by 0 days.

(21) Appl. No.: 10/480,768

(22) PCT Filed: Jun. 17, 2002

(86) PCT No.: PCT/GB02/02773

§ 371 (c)(1), (2), (4) Date: Dec. 12, 2003

(87) PCT Pub. No.: WO02/102626

PCT Pub. Date: Dec. 27, 2002

(65) Prior Publication Data

US 2004/0194653 A1 Oct. 7, 2004

(30) Foreign Application Priority Data

| Jun. 15, 2001 | (GB) | 0114635.6 |
| Sep. 12, 2001 | (GB) | 0122036.7 |
| Oct. 15, 2001 | (GB) | 0124707.1 |
| Nov. 12, 2001 | (GB) | 0127116.2 |
| Mar. 14, 2002 | (GB) | 0206018.4 |
| Apr. 4, 2002  | (GB) | 0207852.5 |

(51) Int. Cl.
 *B41F 33/00* (2006.01)

(52) U.S. Cl. .................. 101/483; 430/200

(58) Field of Classification Search .......... 101/483; 428/195, 254, 500, 913–914, 323, 402–403, 428/457; 430/200, 430; 522/96
See application file for complete search history.

(56) References Cited

U.S. PATENT DOCUMENTS

| 4,983,436 | A | * | 1/1991  | Bailey et al. ........... 428/40.4 |
| 5,066,098 | A | * | 11/1991 | Kult et al. ............. 359/540 |
| 5,080,463 | A | * | 1/1992  | Faykish et al. ......... 359/536 |
| 5,169,707 | A | * | 12/1992 | Faykish et al. ......... 428/195.1 |
| 5,252,991 | A |   | 10/1993 | Storlie et al. |

(Continued)

FOREIGN PATENT DOCUMENTS

EP  0 778 178 A2  6/1997

(Continued)

OTHER PUBLICATIONS

"QLS4100 Digital Color Printer", Quick Label Systems, Rev. 2-2001.*

(Continued)

*Primary Examiner*—Ren Yan
(74) *Attorney, Agent, or Firm*—Caesar, Rivise, Bernstein, Cohen & Pokotilow, Ltd.

(57) ABSTRACT

A method of manufacture of an identification plate: comprises advancing a transparent sheet material having an opaque material in contact with one major surface thereof to a printing station, printing indicia in reverse on the other major surface of the sheet material, and securing the printed sheet material to a substrate having a retro-reflective surface such that the printed surface is in contact with, or at least adjacent to, the retro-reflective surface.

16 Claims, 9 Drawing Sheets

U.S. PATENT DOCUMENTS

| | | | |
|---|---|---|---|
| 5,256,721 A * | 10/1993 | Wilson et al. | 524/539 |
| 5,621,571 A * | 4/1997 | Bantli et al. | 359/529 |
| 5,635,704 A | 6/1997 | Del Signore, II et al. | |
| 5,670,005 A * | 9/1997 | Look et al. | 156/236 |
| 5,727,818 A * | 3/1998 | Schmeida | 283/81 |
| 5,743,981 A * | 4/1998 | Lu | 156/182 |
| 5,788,796 A * | 8/1998 | Look et al. | 156/277 |
| 6,200,666 B1 * | 3/2001 | Christian et al. | 428/195.1 |
| 6,267,052 B1 * | 7/2001 | Hill et al. | 101/211 |
| 6,652,954 B1 * | 11/2003 | Nielsen et al. | 428/143 |
| 6,790,578 B1 * | 9/2004 | Rajan et al. | 430/124 |
| 6,824,839 B1 * | 11/2004 | Popat et al. | 428/32.12 |
| 2002/0163179 A1 * | 11/2002 | Dubner et al. | 283/72 |

FOREIGN PATENT DOCUMENTS

| | | | |
|---|---|---|---|
| EP | 0 806 752 A1 | | 11/1997 |
| EP | 1122131 | * | 8/2004 |
| GB | 1 403 583 A | | 8/1975 |
| GB | 2 126 389 A | | 3/1984 |
| GB | 2 161 305 A | | 1/1986 |
| GB | 2 321 033 A | | 7/1998 |
| GB | 2380308 | * | 4/2003 |
| WO | 94/19769 A2 | | 9/1994 |
| WO | WO94/19710 | * | 9/1994 |
| WO | 96/03285 A1 | | 2/1996 |
| WO | WO00/13938 | * | 3/2000 |

OTHER PUBLICATIONS

International Search Report dated Sep. 20, 2002.
United Kingdom Patent Office Search Report dated Sep. 12, 2002 for GB 0213896.4.

* cited by examiner

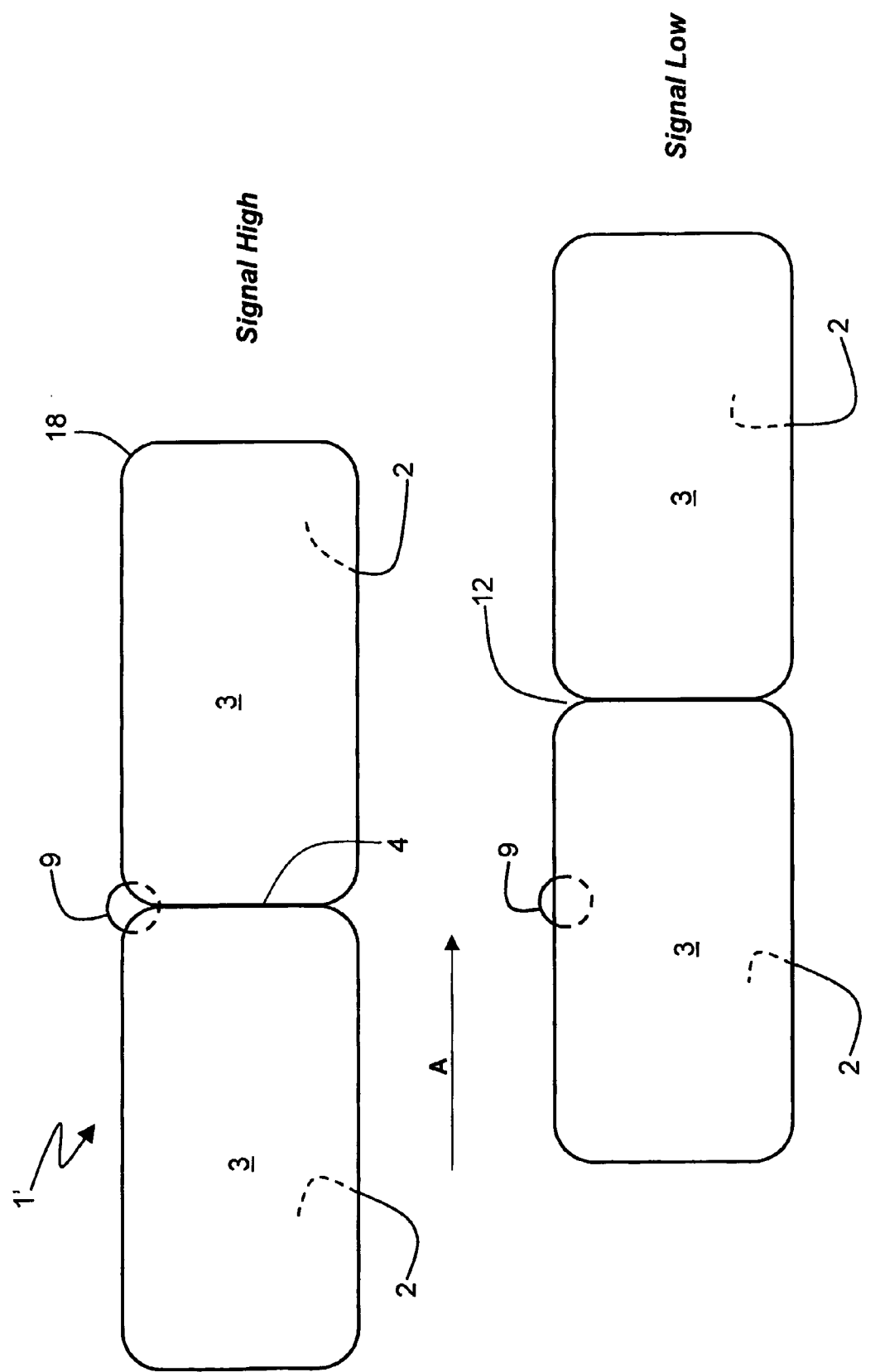

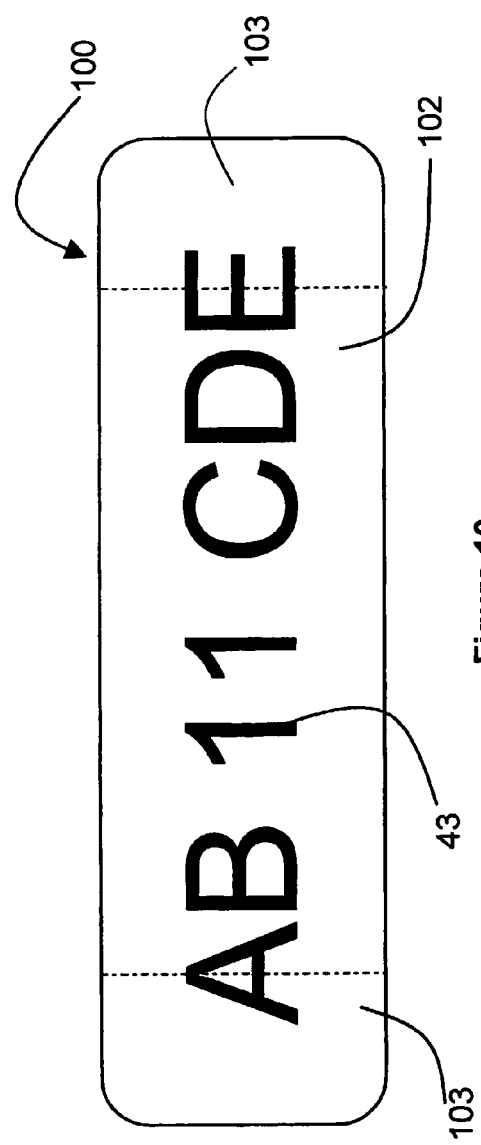
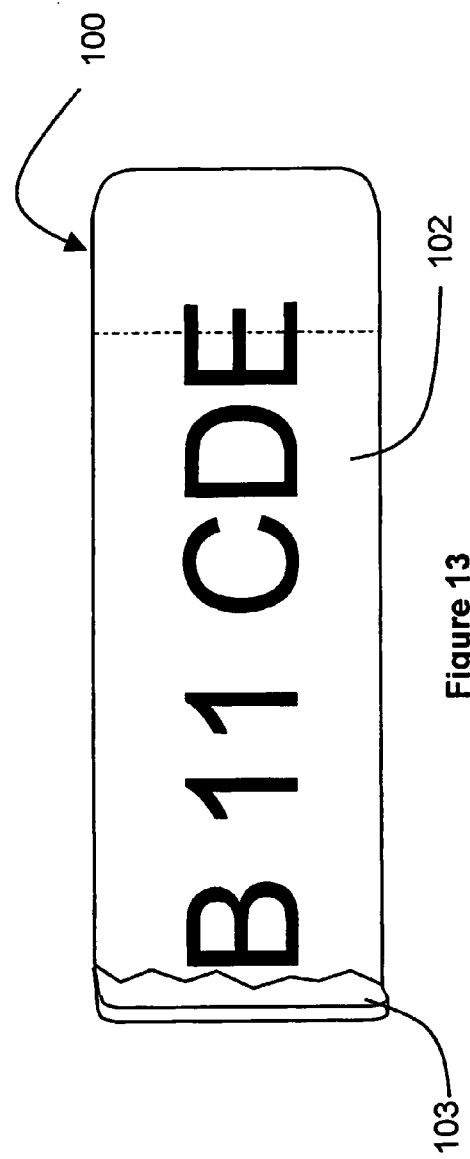

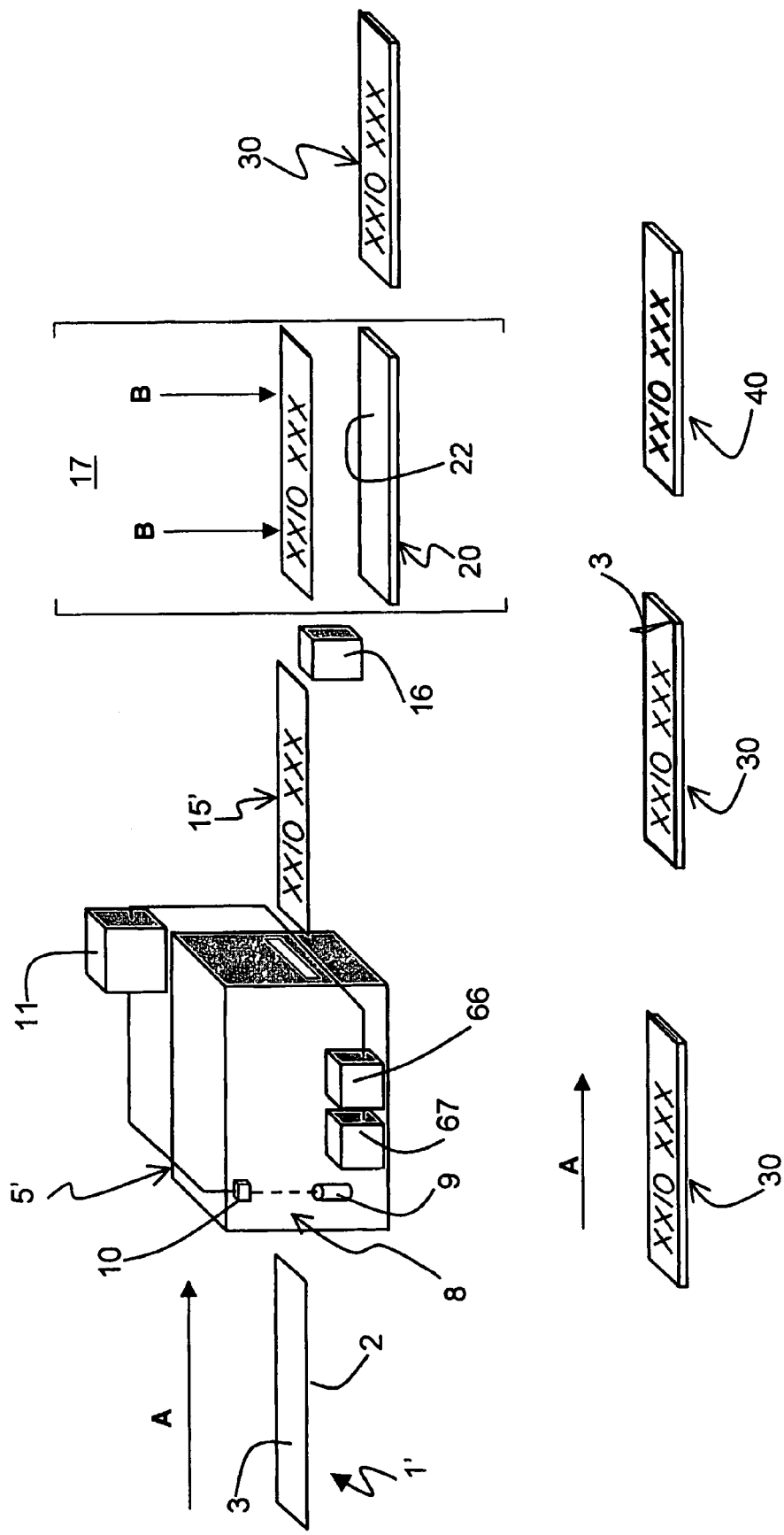

METHOD FOR MANUFACTURING AN IDENTIFICATION PLATE

BACKGROUND OF THE INVENTION

This invention relates to identification plates and, in particular, to plates which indicate the provenance of an object to which they are attached. Such plates are conventionally termed licence or number plates when attached to a motor vehicle.

From 01 Sep. 2001, each United Kingdom licence plate must conform to British Standard BSAU 145d which governs, inter alia, the impact resistance and the minimum retro-reflectivity of the plate. Similar although, in some cases, less stringent provisions exist across the entire European Union, as they do in most other countries across the world.

GB 2126386 A discloses a method of producing licence plates for a vehicle, in which indicia are printed onto a carrier. The carrier may be either a reflective surface or a plastics coating, such as a relatively thick transparent plastics sheet to provide structural support for the plate.

EP 0806752 A1 discloses an identification plate and a method of manufacture of such a plate wherein a rigid transparent substrate has indicia printed thereon. The resulting printed plate is then adhered to an opaque liner such that the indicia are visible through the transparent sheet.

It is known to print on to a nominally retro-reflective surface and then to adhere to that surface a lens, such as a clear polymer layer, to impart to that surface a retro-reflective character. The lens may be a transparent, relatively thick, acrylic layer applied over the retro-reflective surface or a relatively thin layer with a relatively thick backing layer to provide support, as is disclosed in WO 94/19769 A2.

Retro-reflective sheet material is typically a beaded substance which has a rough surface. Consequently, it is difficult to print on, so special formulations of sheet materials, which are able to 'take' the ink, special printing materials such as ribbons, together with the use of elevated print-head temperatures are required. Both of these factors increase the cost. The coarse surface structure of the specially formulated retro-reflective sheet materials can reduce print-head operating life and the elevated print-head temperatures can also reduce print-head lifetimes. It has also been found that print quality suffers at elevated print-head temperatures and with such rough surfaces.

SUMMARY OF THE INVENTION

It is an object of this invention to provide identification plates which can be manufactured by either a continuous process or as an individual plate. It is a more specific object to provide methods of manufacture which are simpler than prior art methods, enabling more efficient assembly of the necessary components and which have reduced the costs compared with known methods. It is a further object of the invention to provide methods of manufacture which provide a manufacturer with a greater degree of flexibility in production, allowing bespoke or "multi-run" plates to be produced.

According to a first aspect of the invention there is provided a method of manufacture of an identification plate, the method comprising:

advancing a transparent sheet material having an opaque material in contact with a first major surface thereof to a printing station;

printing indicia in reverse on to a second major surface of the sheet material;

securing the printed sheet material to a substrate having a retro-reflective surface such that the printed surface is in contact with, or at least adjacent to, the retro-reflective surface.

A more specific aspect of the invention provides a method of manufacturing an identification plate, the method comprising:

advancing a substrate-sized length of transparent sheet material to a printing station, the sheet material having an opaque substance in contact with one major surface thereof;

optically sensing passage of the leading edge of the substrate-sized length of transparent sheet material by attenuation of an optical beam by the opaque substance;

printing indicia in reverse on the other major surface of the sheet material;

securing the printed transparent sheet material to a substrate having a retro-reflective surface such that the printed surface is in contact with, or at least adjacent to, the retro-reflective surface; and removing the opaque material from the transparent sheet material.

A further aspect of the invention provides an identification plate comprising a supporting substrate having two opposed major surfaces, the entire first major surface being retro-reflective, a transparent sheet material having indicia printed thereon, the transparent sheet material being adhered to the first major surface such that the indicia are located adjacent the first major surface.

There is further provided, by a fourth aspect of the invention, an identification plate comprising a supporting substrate having a retro-reflective major surface and an transparent sheet material an entire major surface of which having marking material applied thereto, the transparent sheet material being adhered to the retro-reflective major surface such that the marking material is in contact with, or at least adjacent to, the retro-reflective major surface.

A fifth aspect of the invention provides a method of manufacture of an identification plate, the method comprising:

conveying a transparent sheet material toward printing means;

optically sensing the passage of the transparent sheet material as it is conveyed toward said printing means;

actuating printing means in response to said passage of the transparent sheet to print indicia in reverse on the other major surface of the sheet material; and securing the printed sheet material to a substrate having a retro-reflective surface such that the printed surface is in contact with, or at least adjacent to, the retro-reflective surface.

In a fourth aspect of the invention, there is provided an identification plate comprising a laminate of a support and a transparent sheet material having indicia printed on a surface thereof, the support comprising a matrix material in which is retained a plurality of reflective particles, wherein the indicia are in contact with or are at least adjacent to a major surface of the support and the transparent sheet material provides a lens for the reflective particles located at that major surface, thereby providing the plate with a retro-reflective character.

A further aspect of the invention provides a method of manufacture for an identification plate, the method comprising the steps of:

providing a support having reflective particles distributed in a matrix, wherein the particles are at least present at a first surface of the support;

printing indicia, in reverse, on a surface of a transparent sheet material;

adhering the sheet material to the first surface of the support so that the indicia are sandwiched therebetween;

whereby the sheet material acts as a lens for the particles, imparting a retro-reflective character to the plate.

The reflective particles may be uniformly distributed throughout the support or may be uniformly and/or preferentially distributed at or towards the surface thereof.

The support may be formed by moulding a substance having reflective particles therein. The support may be formed by laminating a retro-reflective sheet material to a substrate. The support may have an extension portion, for example an elongate lip. The support may comprise one or more frangible portions.

Techniques are known for preferentially distributing particles at a surface of a moulded article. Such techniques include gravity separation whilst the matrix material is in a fluid state, which may rely on a difference in density between fluid matrix material and the particles, or preferential drying of one or another surface of the mould by microwave energy or other means.

The reflective particles may be formed of glass, for example glass beads or spheres, or they may be formed from a mineral or a plastics material.

The support may be formed from a plastics material, for example acrylonitrile butadiene styrene (ABS), polyethylene, Nylon (RTM) or other hard-wearing, impact and/or bend resistance plastics materials. In some embodiments the substrate may be formed from a metal or an alloy, for example aluminium or steel.

Preferably, the transparent sheet material is a polymer which, advantageously, may be polyvinyl chloride, polyester, polypropylene or the like.

Preferably, the plate has a main body for primary indicia. An extended portion for further indicia may be provided. The extended portion may be along one of the longer sides of the plate.

Suitable retro-reflective sheet materials are either coated or non-coated. In such coated sheet materials, a thin acrylic layer is applied to the beaded surface, thereby providing those reflective particles with a lens and imbuing the sheet material with retro-reflective characteristics. In non-coated retro-reflective sheet materials the surface is only provided with a retro-reflective character once a lens has been applied to it. With such non-coated retro-reflective sheet materials, when used in the methods disclosed above, the lens is provided by the transparent material and it is only once this material has been applied to the retro-reflective material that the whole 'sandwich' acts retro-reflectively. Whilst non-coated retro-reflective materials are typically less expensive than the coated ones and for that reason may be preferred, it is possible to use either in the methods disclosed herein.

The transparent sheet material may be supplied on a roll, or as individual substrate-sized lengths. If the transparent sheet material is supplied on a roll, it may be shaped as a repeating pattern, each repeat thereof corresponding to a substrate-sized length.

The opaque material may be a release sheet, in one embodiment a paper release sheet. Alternatively, the opaque material may be a plastics release sheet, such as a polypropylene sheet. The release sheet may be provided with a pressure sensitive emulsion adhesive layer, the transparent material may have a silicone layer applied thereto, the silicone layer which is contacted by the adhesive layer of the release sheet facilitates separation of the release sheet and sheet material. The silicone layer and adhesive layer allow the release sheet and sheet material two to be releasably adhered, such that the release sheet may be re-applied to the transparent material.

Said printing means may be arranged to print over some, most, or all of the transparent sheet material.

The transparent sheet material may have secondary and/or other information printed on the other major surface prior to being advanced to the printing station. The printing, on the transparent sheet material, of any secondary and/or other information may be completed 'off-line', which is to say that information may be printed and the transparent sheet material stored or held for future use. The printing of secondary and/or other indicia may be completed immediately before or after printing of the primary indicia.

Said printing means may preferably comprise a thermal mass transfer printer or an ink jet printer.

A further aspect of the invention provides a medium to bear indicia for use in an identification plate, the medium comprising a transparent plastics film carrying a silicone material on a first major face thereof and an opaque liner carrying a pressure sensitive adhesive on a major face thereof; a second major face of the transparent plastics film being printable to, wherein the silicone layer and adhesive layer are in contact and the opaque liner and transparent film are separable and re-attachable by virtue of the releasable interaction between silicone layer and adhesive layer.

BRIEF DESCRIPTION OF THE DRAWINGS

In order that the invention may be more fully understood, it will now be described, by way of example only, and with reference to the accompanying drawings, in which:

FIG. 4 shows a detail of part of the method described in accordance with FIG. 2;

FIG. 10 shows an elevation of a yet further identification plate made in accordance with the invention;

FIG. 13 shows an elevation of the plate of FIG. 8 subsequent to use; and

FIG. 14 shows a variation of the apparatus of FIG. 2.

DETAILED DESCRIPTION OF THE INVENTION

Figure 1:
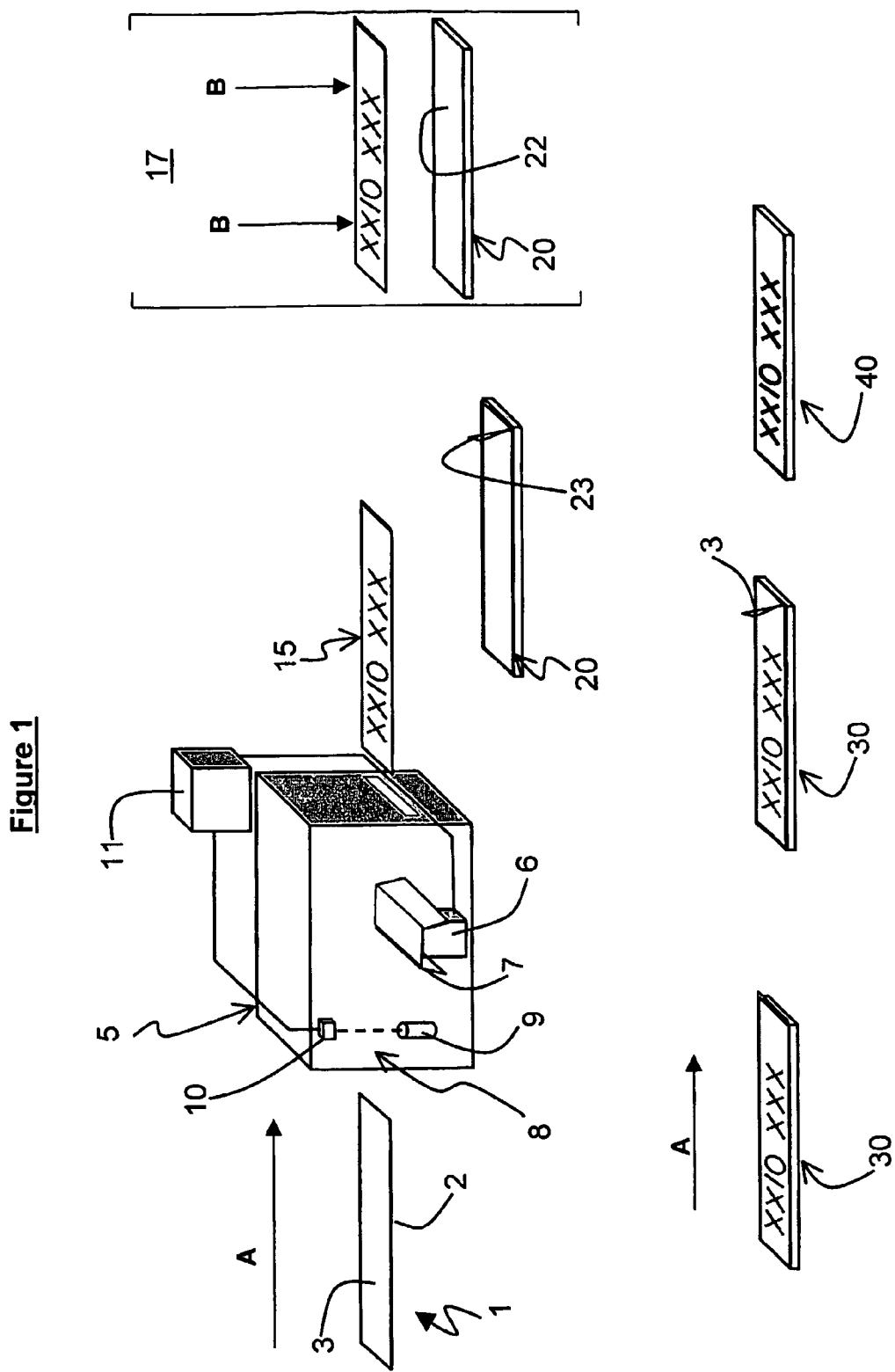
FIG. 1 shows a schematic representation of a method according to the invention.

Referring firstly to FIG. 1, a length of medium 1 to be printed upon comprising a length of transparent film 2, having an opaque release liner 3 in contact with one major surface thereof, is advanced in the direction of arrow A. Among other advantages, which will become apparent, the release liner 3 provides the length of film 2 with some rigidity, making it easier to handle. The transparent film 2 is preferably polyester film with a thickness of about 70 µm. The opaque release liner 3 is preferably paper or polypropylene with a thickness of about 80 µm.

Figure 3:
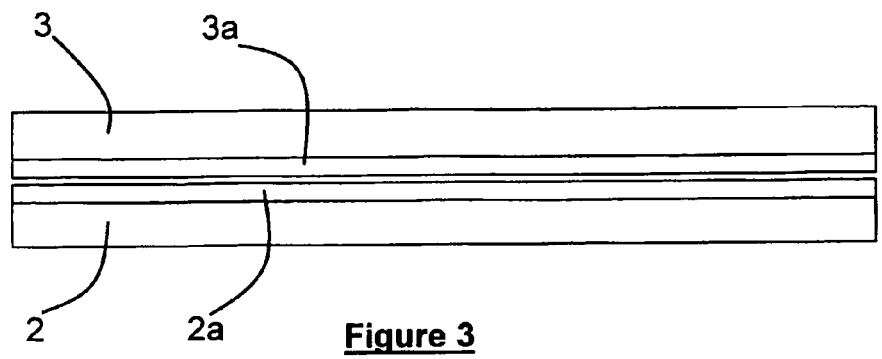
FIG. 3 shows a section through a printable medium according to the invention.

FIG. 3 shows a cross-section of the medium 1. The release liner 3 has a pressure sensitive adhesive emulsion layer 3a applied thereto, that layer is typically 10 to 15 µm thick. The transparent polyester film 2 has a layer of silicone 2a applied thereto, which is typically about 3 to 5 µm thick. The silicone layer 2a is in contact with the adhesive layer 3a. The silicone layer 2a prevents complete adhesion between the adhesive layer 3a and transparent film 2, and allows the release liner 3 to be removed and reapplied to the transparent film 2. This allows inspection of the completed plate and re-application of the release liner 3 to protect the surface during transit to a point of use or storage.

The printable medium 1 is brought to a printer 5 which is a thermal transfer printer having a printing head 6 and a ribbon 7. Mounted either externally or internally of the printer 5 is an optical sensing device 8, comprising an optical beam generator 9 and a detector 10, located on opposite sides of the path of travel of the medium 1.

The output of the optical beam generator 9 is detected by the detector 10 in the usual way so that any non-optically transparent medium which interrupts the beam causes a reduction in the signal detected by the detector 10. The signal detected by the detector 10 can be used to control operation of the printing head 6. For example, if the detected signal rapidly decreases, due to attenuation of the beam, the reduction is detected by signal processing means 11, such as a computer, which, in turn, controls the printing head 6 to print on the film 2. Clearly, the speed at which the medium 1 is conveyed should be monitored and/or controlled. Monitoring the time between maximum signals and the speed at which the medium 1 is conveyed allows accurate control of the location of so-printed indicia.

As the printable medium 1 passes through the optical beam, the signal detected by the detector 10 reduces, due to the presence of the opaque release liner 3. The signal processing means 11 responds to the reduction of detected signal to control the printing head 6 to start and finish printing the desired indicia on the transparent film 2, in reverse. That is to say that the printer 5 prints on the underside, as shown in FIG. 1, of the transparent film 2. The opaque liner 3, which has a rougher surface than the transparent sheet material 2 and adds extra effective thickness, enables the rollers of the printer to both grip the medium 1 and keep it in accurate registration and thereby print onto the transparent film 2.

A computer, which may or may not be the same as said signal processing means 11, holds a store of the indicia desired to be printed onto the medium 1. The information is transmitted to the printer 5 which preferably arranges the formatting of the desired indicia. An eminently suitable and preferred printer is a QLS-4100 series, supplied by Astromed Incorporated of Rhode Island, USA. The print rate of such a printer can be as high as 20.4 cm per second, but is more typically operated at 7.6 cm per second. Therefore, using such a printer with optical control, up to 1200 standard British vehicle licence plates (52.1×11.1 cm) per hour can be produced automatically.

The resulting printed medium 15 is advanced to a lamination station 17. A length of substrate 20 moulded from ABS with a retro-reflective surface 22 is also advanced to the lamination station 17. The substrate 20 is typically from 2.5 to 3.8 mm thick, preferably 3.2 mm thick. The substrate has a release sheet 23 covering a pressure-sensitive adhesive layer (not shown). The adhesive layer has been previously applied, i.e. off-line, although it may be applied as part of the process. The release sheet 23 is removed as the substrate 20 is advanced to the lamination station 17.

The printed medium 15, comprising transparent film 2 and opaque release liner 3, and the length of substrate 20 are shown as being rectangular, with right-angle corners. Other shaped corners are possible, for example, each of the components 2, 3, 20 may have curved or radiused corners.

The so-formed laminated composite 30 is advanced to a further point where the opaque releasable liner 3 is removed from the transparent film 2, thereby providing a finished identification plate 40. Removal of the release liner 3 may be carried out prior to or subsequent to installation of the plate 30 on a vehicle so that the surface of the plate 30 is protected during transit. The silicone layer 2a will be removed by the action of the elements, precipitation, wind and so on.

The transparent film 2 acts as a lens for a non-coated retro-reflective surface 22 providing it with a retro-reflective characteristic. As the lens for the retro-reflective surface 22 is simply a thin film 2 rather than a thick, transparent substrate, as is the case in certain prior art techniques, it is found that the indicia are clearer and the plate 40 has a higher retro-reflectivity (due to the much shorter path length for impinging and reflected light), both of which are desiderata of vehicle licence plates. When coated retro-reflective surfaces 22 are utilised, the thin film 2 does not impair the retro-reflective character of the surface 22.

The above description has concentrated on what may be called individual or 'single-shot' printing. However, what may be termed continuous, 'batch' or web printing may also be used, wherein a length of printable medium 1' comprising a web of transparent film 2 provided with a releasable backing layer 3 is delineated into substrate-sized lengths by transverse perforations 4, as shown in FIG. 4. The individual lengths are shaped with rounded corners 18.

Figure 2:
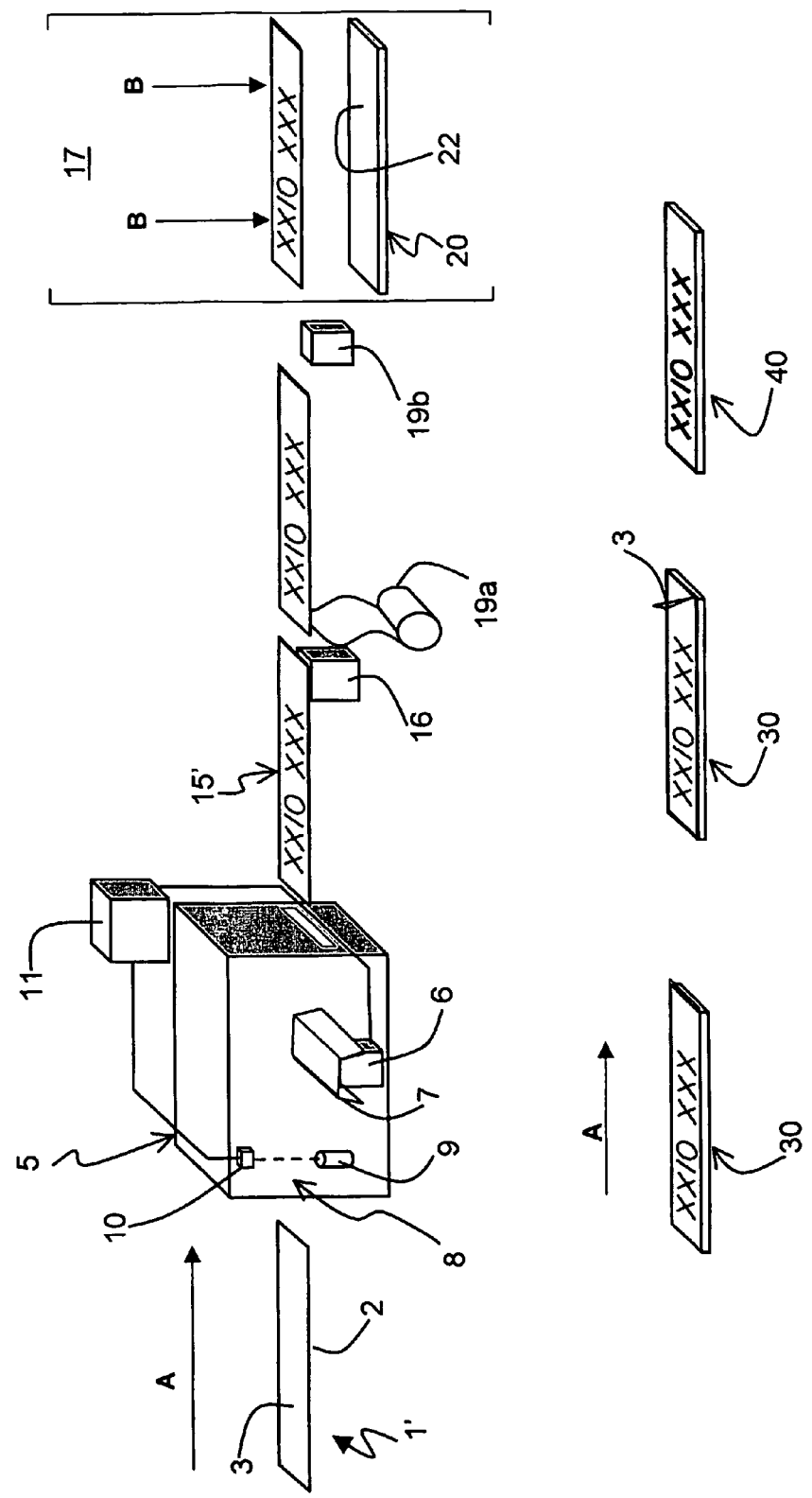
FIG. 2 shows a schematic representation of a variant method according to the invention.

Referring to FIGS. 2 and 4, the printable medium 1' (in FIG. 2) is shown as an individual length for the sake of clarity but, as will be appreciated, the medium 1' is a continuous length or web. The medium 1' is advanced to the printer 5, as indicated by arrow A. As a length passes over the optical beam generator 9, the detected signal reaches a maximum when a 'viewing window' 12, formed by the rounded corners 18 of adjacent individual lengths of printable medium 1', is directly in the path of the optical beam. The maximum detected signal will correspond to when the least amount of beam-attenuating material lies between the beam generator 9 and detector 10, such as when the perforations 4 are in-line with the optical beam. The minimum detected signal occurs when the most beam-attenuating material lies between the beam generator 9 and detector 10. Both extremes are shown in FIG. 2. By pre-calibration, the difference between maximum and minimum signals can be used to control the printing head 6 to print indicia, in reverse, on a major surface of the transparent film 2.

The resulting printed medium 15' has an adhesive applied to its lowermost surface, i.e. the surface which was printed on to, at adhesive application station 16. A release liner may then be applied to that surface to protect the adhesive from contamination at release-liner-application station 19a.

The further release liner-carrying printed medium 15' is advanced to a lamination station 17. A length of substrate 20 moulded from ABS, with a retro-reflective surface 22 is similarly brought to the lamination station 17. The substrate 20 is typically from 2.5 to 3.8 mm thick, preferably 3.2 mm thick.

Immediately prior to registration of the printed medium 15' with the substrate 20, the further release liner, if previously applied, is removed from the adhesive-bearing surface of the printed medium at release-liner-removal station 19b. The printed medium 15' and substrate 20 are laminated together, using pressure, as indicated by arrows B in the station 17, thereby sandwiching the indicia between the retro-reflective surface 22 and the transparent film 2. The adhesive is pressure-sensitive, which is to say it acts to adhere the two components 15', 20 through the application of pressure. A suitable acrylic adhesive is S2001, supplied by MACtac Europe SA. The release liner may have transverse perforations corresponding to those 4 of the medium 1'.

The leading edge of the first printed length is brought into intimate contact with a length of substrate 20, having a retro-reflective surface 22. Either before or after lamination of the printed length to the substrate 20 has been fully effected, the perforations are broken to provide a separate identification plate 40.

In an alternative arrangement, the medium 1', having a shaped transparent film 2 with correspondingly shaped opaque release liner 3 as before, is not delineated by transverse perforations 4, the line 4 being the intended location of a cut line or perforated line about which individual lengths will be provided. The printer 5 is actuated following optical monitoring of the passage of the medium 1' passed an optical sensing device 8, as above. An adhesive is applied to the printed surface of the transparent film 2 which then has a further release liner applied thereto to protect the adhesive from contamination.

The so-formed medium 15' may be cut into substrate-sized lengths at intended cut line 4 prior to removal of the further release liner at station 19b or subsequent to removal of that further release liner at station 19b, the latter being the most preferred.

The substrate 20 may be formed in many ways. The first is simply to mould or extrude ABS or to cut a substrate to the desired shape and size from a sheet of material and adhere, by lamination, a retro-reflective film to one major surface thereof. Suitable retro-reflective film materials are Diamond Grade and Engineer Grade retro-reflective sheeting supplied by Minnesota, Mining and Manufacturing Company (3M) of St. Pauls, Minn., USA, although others may be used. It is often beneficial to mould the surface of the substrate 20 with a slightly textured or roughened surface to aid adhesion of the retro-reflective material thereto.

Other retro-reflective sheet materials which may be used are formed as a composite of a retro-reflective sheet material having an adhesive applied to both major surfaces thereof, the adhesive being covered by release sheets. The intended lowermost surface of the retro-reflective sheet material is adhered to a suitably sized length of substrate by lamination following removal of the lowermost release sheet. The substrate, with retro-reflective sheet material applied thereto, can then be stored for subsequent use or can be used immediately by removing the uppermost release sheet, thereby exposing the adhesive-covered retro-reflective surface. The printed upon surface of the transparent sheet is then laminated thereto. Such a retro-reflective composite obviates the need for an adhesive application station 16 or to apply adhesive to the retro-reflective surface.

As one alternative, the ABS, or other plastics material from which the substrate 20 is moulded, has a substrate-sized length of retro-reflective material moulded therewith.

To effect such moulding, the leading edge of a length of retro-reflective sheet material is placed, pulled or otherwise drawn into a mould, where it is clamped in place. One portion of the mould then closes on the sheet. Whilst one major surface of the retro-reflective material is in contact with the top of the mould, a cavity is provided between the other major surface of the retro-reflective material and the bottom of the mould. A plastics material, such as ABS, is injected into the cavity. As the mould is closed shut, the retro-reflective material is adhered to the substrate 20. The length of retro-reflective material may be the same size as the mould or it may be over-sized. If it is over-sized the excess will be trimmed off.

Such a method removes the need for forming a substrate length 20 with a roughened surface and subsequently laminating a retro-reflective sheet material thereto, thereby reducing the cost.

Figure 5:
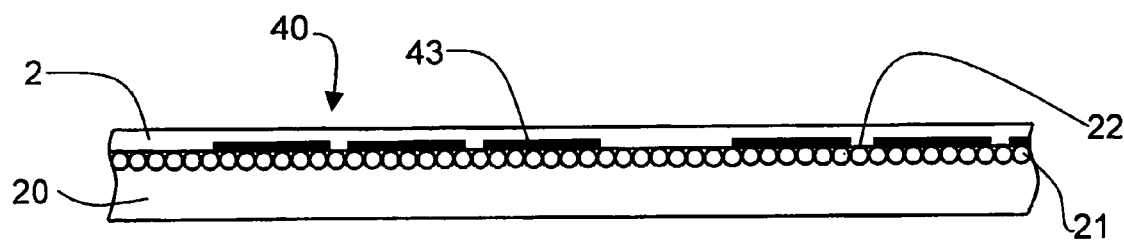
FIG. 5 shows a section through an identification plate made in accordance with the invention.

Referring to FIG. 5, a sectional view of a plate 40 made according to the above-described method is shown. The substrate 20 is a moulded length of plastics material, such as ABS, which has a plurality of reflective glass beads 21 retained therein which provide the retro-reflective surface 22. Adhered to the substrate 20 is a transparent plastics film 2, having indicia 43 printed thereon.

The substrate 20 shown in FIG. 5, is formed by moulding a plastics material in which is distributed reflective bodies, such as glass spheres of, say, up to 15 μm diameter. Once the plastics material is forced into the mould, the glass spheres are allowed to settle by gravity (if their density is greater than that of the fluid plastics material) or rise to the surface (if their density is less than that of the fluid plastics material). As an alternative, selective drying by microwaves can be used to encourage the beads 21 to preferentially move toward one surface. Other methods for achieving such a result are known to the man skilled in the art.

Figure 6:
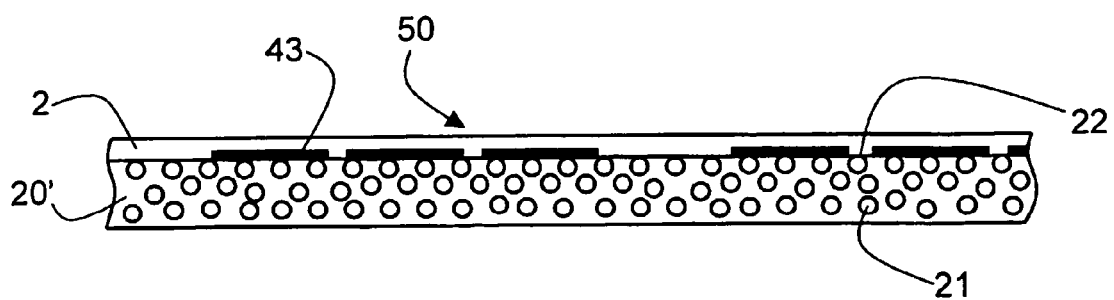
FIG. 6 shows section through a further identification plate made in accordance with the invention.

FIG. 6 shows a plate 40' having a substrate 20', to which is attached a film 2 having indicia 43 printed thereon. In this substrate 20', the reflective particles 21 are substantially evenly distributed throughout its' thickness. The number of particles 21 per unit volume may be greater than as shown to achieve the necessary retro-reflectivity of the completed plate 50.

In this case, the particles 21 are not allowed to settle or rise to a surface. Alternatively, the concentration of particles 21 within the plastics material 20' may be so great that they are unable to preferentially settle toward a particular surface or they may have a density substantially equivalent to that of the fluid plastics material, thereby preventing any preferential settling of one component over the other.

Once the transparent plastics film 2 has been applied to the surface of the substrate 20, 20' it has a retro-reflective character. Whilst glass beads and other reflective particles do not have as high an absolute reflective property as bespoke retro-reflective materials, because the film 2 is so thin, compared to a lens using a 3.2 mm thick acrylate sheet (as is considered in certain prior art applications), the retro-reflectivity of the plates 40, 40' is sufficient to meet the required standard.

Figure 7:
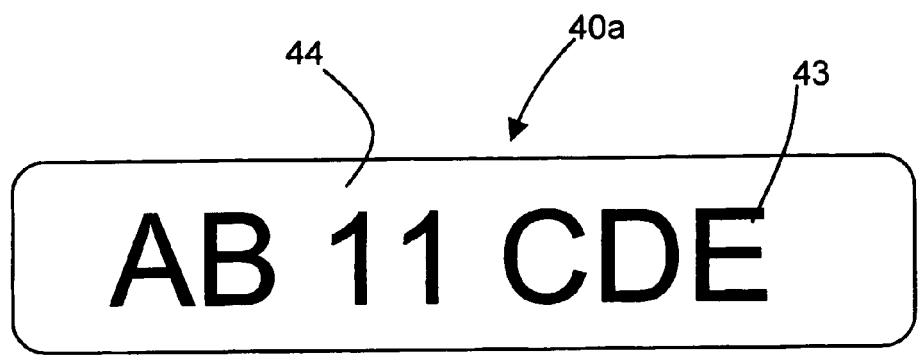
FIG. 7 shows an elevation of an identification plate made in accordance with the invention.

FIG. 7 shows an identification plate 40a, which can be fabricated using the above-described methods. The plate 40a has a main body portion 44 with visible indicia 43.

Figure 8:
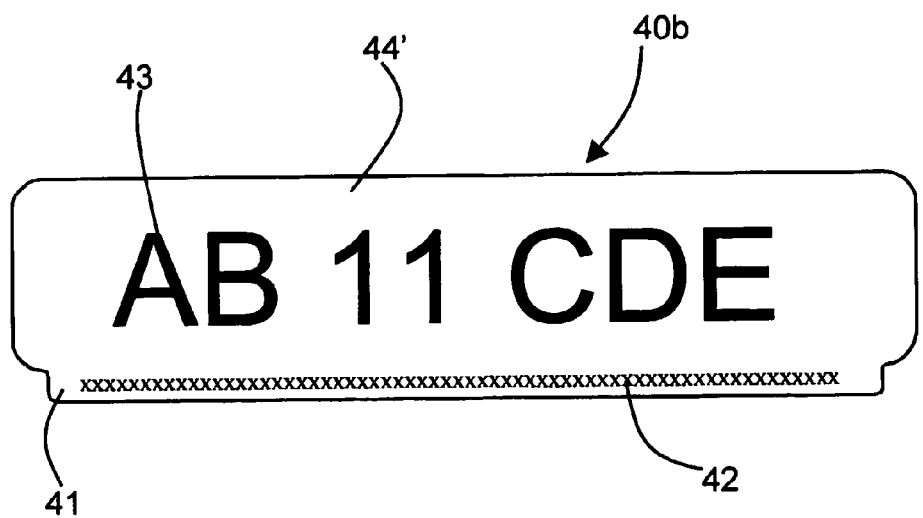
FIG. 8 shows an elevation of a further identification plate made in accordance with the invention.

FIG. 8 shows a plate 40b with an extended portion 41 along the intended bottom edge thereof for tertiary indicia 42. Primary indicia 43 are visible. Secondary indicia (not shown) may be printed on the transparent film 2 to stand out against the main body 44' of the plate 40b. The tertiary indicia 42 may comprise advertising or other personalisations and may be printed "off-line" or may be printed concurrently with, or consecutively to, the primary indicia 43. A white or other coloured backing layer may be applied to the substrate 20 over the extended portion 41 to provide a backing for the tertiary indicia 42. In a further embodiment, the tertiary indicia 42 may be printed in a colour which is visible against the substrate 20. The transparent film 2 may be applied to the whole, part or none of the extended portion 41. The retro-reflective surface 22 may extend over some or all of the extended portion 41.

Clearly, with computer control of the printer 5, different indicia can be printed on subsequent lengths of media 1, 1'. In the case of vehicle licence plates, it is possible to print two identical sets of indicia on subsequent lengths, one for the front and one for the rear plate, and then to print another two identical sets of indicia, and so on.

The printable media 1, 1' may be pre-printed with general information as secondary indicia. Such information may show the manufacturer, supplier or other personalisations, security information and the like. Such pre-printing provides a greater degree of flexibility for a manufacturer with a small turnover of identification plates as any general information is pre-printed and the printer 5 can be used to simply print the desired specific, primary indicia 43, such as a licence plate number. Thus, a manufacturer can hold supplies of the pre-printed printable medium 1, 1' and print primary indicia 43 as and when identification plates 40 are required.

Using process control printing, as is possible with the Astro-med QLS 4100 series printer, it is possible to simplify further, and commensurately reduce the cost of, fabricating a licence plate.

One of the requirements of the British Standard referred to above is that the retro-reflective material of the vehicle's intended rear number plate is a certain shade of yellow. In Greece, for example, one of the background colours of the plates must be blue. It is a further requirement, within Europe, that a regional country identifier as well as the Euro flag (EU Council Regulation 2411/98[3]) is provided on a car's licence plate when travelling from a 'home' country to a different European country. Because, conventionally, the country identifier is supplied printed on to the retro-reflective sheet material the costs are increased. Furthermore, yellow and other coloured retro-reflective materials which meet the required standards are relatively expensive.

Using process control of the printer 5, it is possible to print a translucent coloured marking material onto the transparent film 2. Further, it is possible to print a blue 'Euro' flag on to the transparent film 2 and the country identifier as well as the primary indicia 43 and any secondary and any tertiary indicia 42. The printer 5 prints each of the primary 43, secondary and any tertiary indicia 42, as well as the coloured translucent material on to the transparent film 2 from dedicated printing ribbons 7. None of any of the respective marking materials need overlay any other, due to accurate and precise computer control of the print head 6.

Clearly if, as in the United Kingdom, the intended rear (yellow) and front (white) vehicle number plates are different colours, two manufacturing lines will conventionally be used. An alternative is to alternate the coloured plates say, yellow and white, on a manufacturing line. This approach can lead to problems when one of a pair of plates is, say, spoiled or if, say, two white or two yellow coloured substrates are placed on the manufacturing line by mistake. Thus, by process control printing, stock levels can be reduced as can the number of manufacturing lines needed.

The coloured translucent material applied to the film 2 allows a white retro-reflective surface 22 to be used, the coloured translucent marking material imbuing the so-formed plate with the required colour. Such white retro-reflective sheet materials are significantly cheaper than those in the required shades of yellow and other colours. The thickness of the coloured marking material applied to the film 2 is such that it only minimally interferes with the retro-reflective nature of the retro-reflective material. Such an approach may also be used to provide the required colour of retro-reflective surface of the plates 40, 40' of FIGS. 3 and 4.

Figure 9:
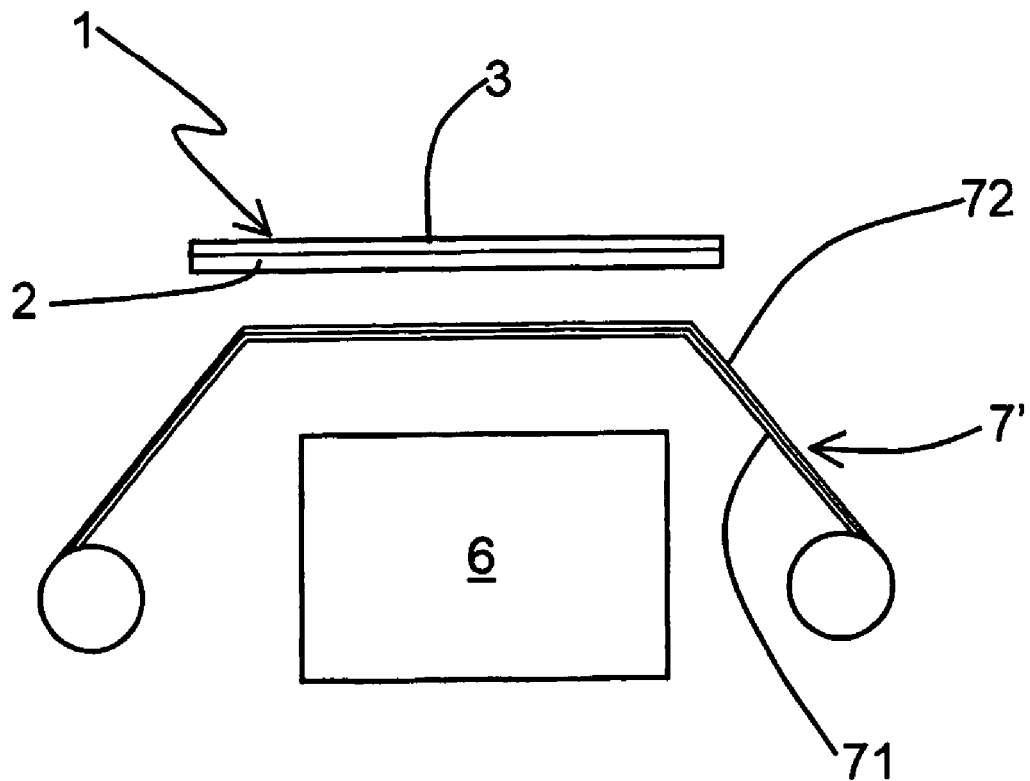
FIG. 9 shows a detail of a printer.

FIG. 9 shows a detail of the printer 5, having the thermal printing head 6 and ribbon 7'. As the printable medium 1, 1', having a transparent sheet 2 and release liner 3, passes over the ribbon 7', the printing head 6 is activated to transfer some of the pigmented wax and/or resin on the ribbon 7' to the transparent sheet 3 through the application of heat and pressure.

Certain colours, such a black and red tend to be laid onto the transparent film 2 such that the retro-reflective surface 22 is not visible through those indicia. For those colours, a conventional single layer ribbon 7 wherein a single layer of wax and/or resin coloured marking material is provided on a foil and is transferred to the film 2 by the application of heat and pressure from the print head 6.

However, in some circumstances, and with some colours, it is necessary to ensure that the so-printed indicia are of sufficient clarity and visibility when the transparent sheet 3 is adhered to the retro-reflective surface 22. In those circumstances a composite ribbon 7' is provided.

The composite ribbon 7' comprises a dual layer of wax and or resin, the first 72, which is intended for contact with the transparent sheet material 2 is the desired colour and the second 71, which is to lie adjacent the retro-reflective surface 22 of the substrate 20 in the completed plate 40, 40' is opaque, usually white. Using single layer as well as composite ribbons 7' ensures that the printed primary, any secondary and/or any tertiary indicia 42, 43 are visible and also ensures that the retro-reflective surface 22 underneath the indicia 42, 43 does not show through during use.

A further advantage of moulding the substrate 20, 20' is that it can be formed with a cavity in its' rear surface. The cavity can be sized and formed such that an electrical device can be housed therein. Such devices may be sensors, signal emitters or transponders. An example may be a transponder used for traffic monitoring across a road network, for example, across automatically charged toll roads. Alternatively, a vehicle security device may be mounted therein, to warn of, say, theft of the number plates of a vehicle. A host of devices may be housed in such a cavity. In prior art plates, where a clear substrate is applied over the retro-reflective material, the indicia being sandwiched therebetween, it is not possible to provide such a cavity as any device installed in such a cavity would obscure part of the retro-reflective material.

FIG. 10 shows a specific embodiment of a licence plate 100 made in accordance with the methods described above. The licence plate 100 bearing indicia 43 is constructed to be tamper evident and has a first portion 102 located between two second portions 103. No clear delineation of the portions 102, 103 is visible from the front of the plate 100, as shown in FIG. 10.

Figure 11:
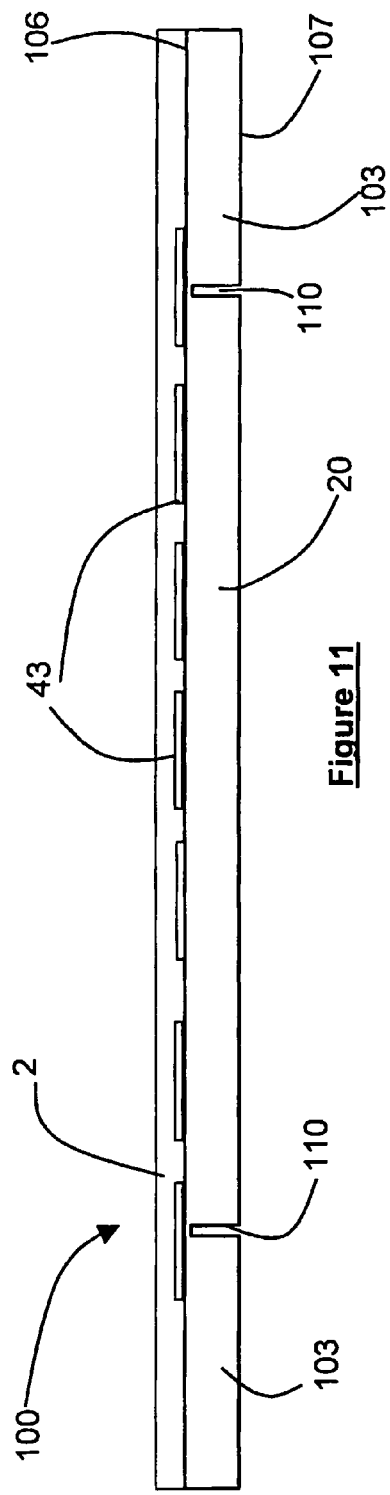
FIG. 11 shows a section through the plate of FIG. 8.

FIG. 11 is a side elevation of the plate 100. The plate 100 is formed from an elongate ABS substrate 20 having opposed first and second faces 106, 107.

The first face 106 is retro-reflective, either having a retro-reflective sheet material adhered thereto or having retro-reflective particles embedded therein. A translucent sheet material 2 having indicia 43 printed thereon is adhered to the retro-reflective surface 106.

The substrate 20 has lines of weakness 110 formed in the second face 107. These take the form of channels or grooves cut into or moulded with the substrate 20.

Figure 12:
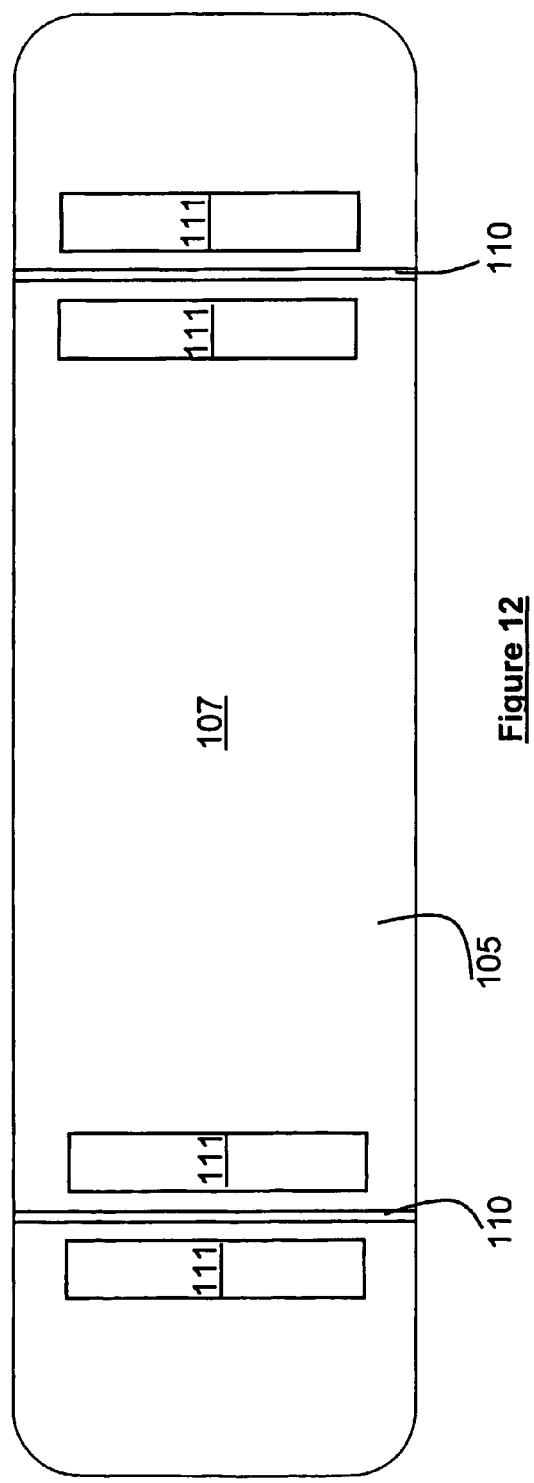
FIG. 12 shows an elevation of the plate of FIG. 8 from the reverse side.

As shown in FIG. 12, lines 110 extend across the width of the second face 107.

Adhered to the face 107 are sticky pads 111, each being covered by a release layer as is known in the art. A pad 111 is present on each side of the lines 110. The pads do not extend the full width of the face 107.

To fit the plate 100 to a vehicle, the release layer is removed from each sticky pad 111 and the plate pressed onto the vehicle. The pads comprise a contact adhesive which adheres the plate 100 to the vehicle.

If the substrate 20 is moulded, the lines 100 are formed during part of the moulding process. As one alternative, the lines 100 could be milled out from the substrate 20.

A thief or other unscrupulous person who attempts to remove the plate 100 from a vehicle will need to prise the plate 100 away from the vehicle. The easiest point of attack is at either end of the plate 100. The force required to remove the sticky pads 111 from the vehicle bumper is substantial, whereas the force required to snap the plate 100 about a line of weakness 110 is less. Accordingly, as an attempt is made to prise the plate 100 from the vehicle, the plate will fracture about a line of weakness 110. Once a fracture occurs, delamination of the film 2 adjacent the fracture line occurs, ruining the appearance of the plate 100 and ensuring that the plate 100 cannot be used again, as indicated in FIG. 13.

Further, should a person attempt to remove the film 2 with the indicia 43 from the plate 100, the strength of the adhesion of the film 2 to surface 106 of the plate 100 causes the film 2 to stretch as it is removed, thereby ruining the appearance of the indicia 43 and film 2.

As a further embellishment, an electric contact can be made across the line of weakness 110, so that upon an attempt to remove the plate 100 from a vehicle the contact is broken and an alarm sounds. The contact may be directly wired to the vehicles on-board alarm system.

The plate 100 appears from the front as a 'normal' licence plate, thus the unsuspecting vehicle licence plate thief will not know until such times as the plate 100 breaks in his hands that he cannot remove it intact.

Vehicles which would benefit from having secure, unstealable, or tamper evident, licence plates are those for the military, police, diplomatic service, security vans and the like. However, clearly any vehicle could benefit from such tamper evident plates 100.

In the above-described methods a thermal transfer printer is used, FIG. 14 shows an ink jet printer 5' having an ink jet head 67 with a UV curing lamp 66 to dry to so-applied ink, which could be used in place of the thermal transfer printer. A further release layer application station may be present subsequent to application of the adhesive at station 16.

Other variations and modifications to the apparatus may be made without departing from the scope of the invention. For example, the signal processing means 11 may be used to control each stage of the method, conveying, printing, lamination, separation of perforations and so on. The optical beam generator and detector system may be a duplex system wherein the output of the beam is constantly monitored by a further detector, the signal utilised by the processing means 11 being a ratio of the two detected signals, thereby normalising for beam strength fluctuation. The optical beam generator may be a simple light source such as a small bulb held in a tube, a diode or any other radiation source which would be suitably attenuated by the release liner 3. The adhesive which is used to ensure lamination of the printed medium 15 and the substrate 20 may be applied to the retro-reflective surface 22 of the substrate 20.

The methods disclosed herein can be used to manufacture vehicle licence plates as well as other signage—warning signs, direction signs, room-use indicators and so on. Frangible portions may be used to ensure that any such signs may not be removed from their intended location without them fracturing or otherwise becoming obviously removed.

The invention claimed is:

1. A method of manufacture of an identification plate, the method comprising:

advancing a relatively thin transparent sheet material having an opaque release liner in contact with a first major surface thereof to a printing station;

printing indicia in reverse on to a second major surface of the sheet material;

securing the printed sheet material to a relatively thick substrate having a retro-reflective surface such that the printed surface is in contact with, or at least adjacent to, the retro-reflective surface and;

removing the opaque release liner from the relatively thin transparent sheet material subsequent to securing the relatively thin transparent sheet to the relatively thick substrate.

2. A method according to claim 1 further comprising the steps of:

optically sensing passage of the leading edge of the relatively thin transparent sheet material as it advances toward the printing station by attenuation of an optical beam by the opaque release liner.

3. A method according to claim 1, comprising the preliminary step of securing a retro-reflective sheet material to a major surface of the relatively thick substrate and thereby forming the entire retro-reflective surface.

4. A method according to claim 1, comprising the preliminary step of locating a retro-reflective sheet material within a mould and injecting plastics material into the mould, thereby forming a relatively thick substrate with an entire retro-reflective surface.

5. A method according to claim 1, comprising the preliminary step of locating reflective particles in a molten plastics material to form a plastics matrix and moulding that matrix to form a substrate having an entire retro-reflective surface.

6. A method according to claim 1, comprising printing, at the printing station, over the entire major surface of the transparent sheet material.

7. A method according to claim 1, comprising pre-printing some markings on the to-be printed upon major surface of the relatively thin transparent sheet material.

8. A method according to claim 1, comprising printing, at the printing station, in different colours and shades over distinct portions of the to-be printed upon major surface of the relatively thin transparent sheet material.

9. A method according to claim 1, comprising supplying the relatively thin transparent sheet material from a roll of relatively thin transparent sheet material.

10. A method according to claim 9, wherein the roll of relatively thin transparent sheet material is shaped to have a repeating pattern, each repeat being a substrate-sized length.

11. A method according to claim 1, comprising supplying the relatively thin transparent sheet material as individual substrate-sized lengths.

12. The method according to claim 1, further comprising forming one or more lines of weakness in the relatively thick substrate.

13. The method according to claim 1, further comprising forming a cavity in the relatively thick substrate for a location of an electronic or electric device.

14. A method of manufacture of a vehicle identification plate, the method comprising:
   conveying a relatively thin transparent sheet material toward printing means said transparent sheet material having an opaque release liner in contact with a first major surface thereof;
   optically sensing the passage of the relatively thin transparent sheet as it is conveyed toward said printing means;
   actuating printing means in response to said passage of the relatively thin transparent sheet material to print indicia in reverse on a second major surface of the relatively thin transparent sheet material; and
   securing the printed relatively thin transparent sheet material to a relatively thick substrate having an entire retro-reflective surface such that the printed second major surface is in contact with, or at least adjacent to, the entire retro-reflective surface, and
   subsequently removing said opaque release liner.

15. A method according to claim 14, comprising the preliminary step of securing a retro-reflective sheet material to a major surface of the relatively thick substrate and thereby forming the entire retro-reflective surface.

16. A method according to claim 14, comprising the preliminary step of locating a retro-reflective sheet material within a mould and injecting plastics material into the mould, thereby forming a relatively thick substrate with an entire retro-reflective surface.

\* \* \* \* \*